(12) United States Patent
Choi et al.

(10) Patent No.: US 9,324,176 B2
(45) Date of Patent: Apr. 26, 2016

(54) APPARATUS AND METHOD FOR SAVING AND UPDATING IMAGE FILE

(71) Applicant: Pantech Co., Ltd., Seoul (KR)

(72) Inventors: Won Gyu Choi, Seoul (KR); Sang Houn Kim, Seoul (KR); Yong Guk Park, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 389 days.

(21) Appl. No.: 13/737,582

(22) Filed: Jan. 9, 2013

(65) Prior Publication Data

US 2013/0249898 A1    Sep. 26, 2013

(30) Foreign Application Priority Data

Mar. 26, 2012 (KR) .................. 10-2012-0030546

(51) Int. Cl.
*G06T 15/04* (2011.01)
*G06T 15/20* (2011.01)
*G06T 17/05* (2011.01)
*G06T 11/00* (2006.01)

(52) U.S. Cl.
CPC ................. *G06T 15/04* (2013.01); *G06T 11/00* (2013.01); *G06T 15/205* (2013.01); *G06T 17/05* (2013.01)

(58) Field of Classification Search
None
See application file for complete search history.

(56) References Cited

U.S. PATENT DOCUMENTS

| 2004/0114814 | A1* | 6/2004 | Boliek et al. | 382/233 |
| 2006/0001668 | A1* | 1/2006 | Johnson et al. | 345/473 |
| 2009/0174798 | A1* | 7/2009 | Nilsson | 348/294 |

* cited by examiner

*Primary Examiner* — Mark Zimmerman
*Assistant Examiner* — Vu Nguyen
(74) *Attorney, Agent, or Firm* — H.C. Park & Associates, PLC

(57) ABSTRACT

An image saving apparatus may extract an object from a photographed picture, and may store position information. The image saving apparatus may selectively perform image processing of each object using the position information and may provide a user with a dynamic image in which a change in the photograph range is considered.

17 Claims, 7 Drawing Sheets

APPARATUS AND METHOD FOR SAVING AND UPDATING IMAGE FILE

CROSS-REFERENCE TO RELATED APPLICATION

This application claims priority from and the benefit of Korean Patent Application No. 10-2012-0030546, filed on Mar. 26, 2012, which is hereby incorporated by reference for all purposes as if fully set forth herein.

BACKGROUND

1. Field

Exemplary embodiments of the present invention relate to storing an image file and more particularly, to updating a photographed picture using information about a current time.

2. Discussion of the Background

A related image saving scheme may store, in a buffer, image data that is acquired using a camera mounted in or on a mobile phone, and may store the stored image data as an image file.

A related image synthesizing scheme may generate a static image by synthesizing the stored image data with a different image. The related image synthesizing scheme may perform synthesis by classifying separate images into multiple layers, and by arranging each layer at a selected position.

In addition, according to the related art, global positioning system (GPS) position information and additional data such as a time when a picture is photographed, a text, and the like may be added to a static image and thereby may be stored as an image file. Additional information about individual objects may not be stored. Accordingly, there are some constraints on applying an individual image synthesis scheme with respect to each object.

SUMMARY

Exemplary embodiments of the present invention provide an apparatus to save and update an image file.

Exemplary embodiments of present invention also provide a method for saving and updating an image file.

Additional features of the invention will be set forth in the description which follows, and in part will be apparent from the description, or may be learned by practice of the invention.

An exemplary embodiment of the present invention discloses a method for storing and updating an image file, including: extracting a first object from the image file; determining first position information of the first object according to a location of the image of the image file; grouping the first object into a first layer according to the first position information; determining an updated condition of the first position information of the first object; generating a second image according to the updated condition of the first position information in a second layer; storing the first layer and the second layer.

An exemplary embodiment of the present invention also discloses an apparatus to store an updated image file, including: an object extractor to determine a first object in the image file; a position information adder to determine a first location of the first object and to receive updated condition information about the first location of the first object; a grouping unit to group the first object into a first layer according to the location of the first object; and an image processing unit to generate a second layer including a second image according to the updated condition of the location of the first object.

An exemplary embodiment of the present invention also discloses a method for storing a dynamic image file, including: receiving an image file; extracting a first object from the image file; determining a first position of the first object; grouping the first object into a first layer according to the first position; determining if the first object is a dynamic object; if the first object is a dynamic object, receiving updated condition information of the first object; processing the image of the first object according to the updated condition; storing the first layer according to the processing of the image of the first object.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
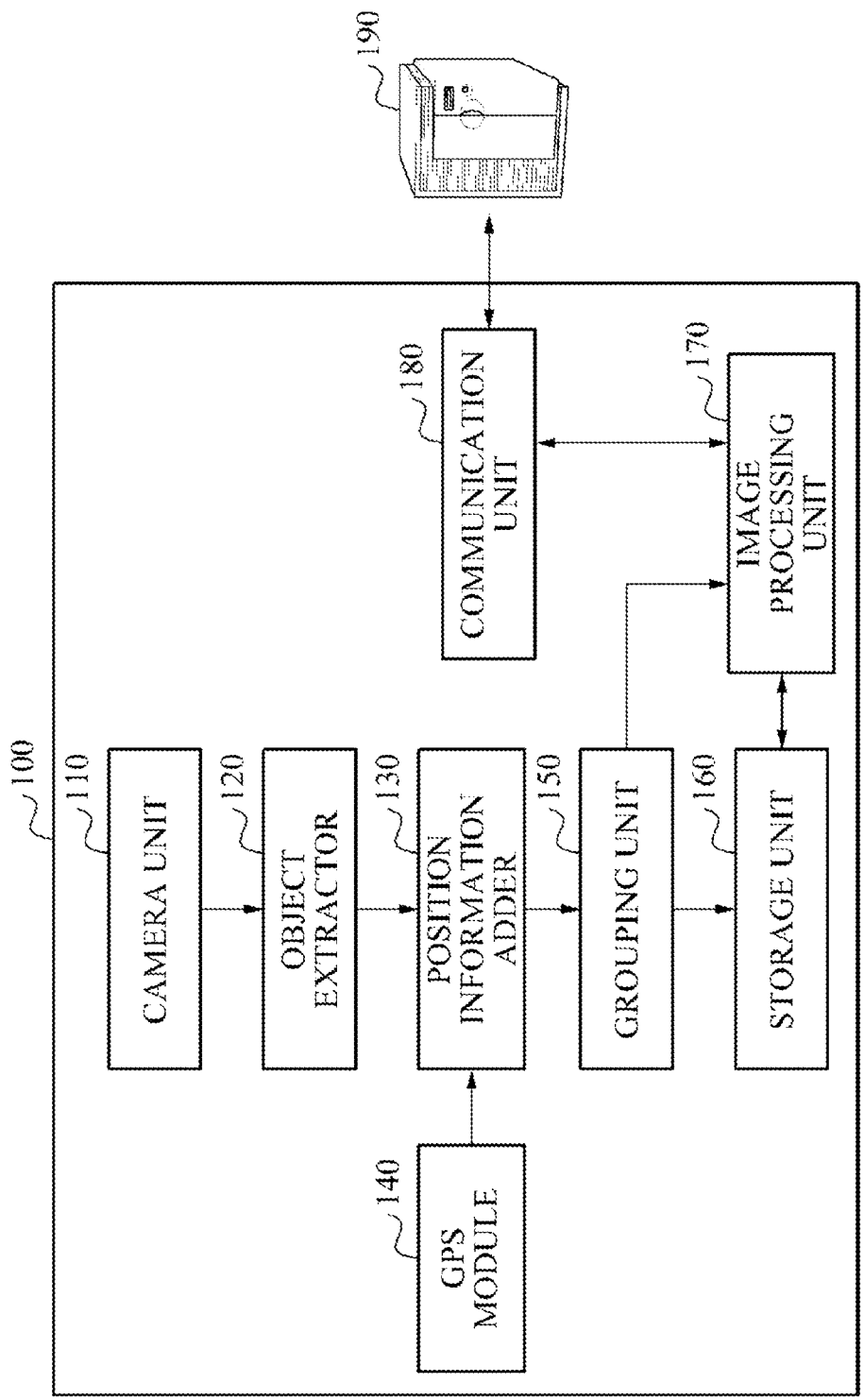
FIG. 1 is a block diagram of an image saving apparatus according to an exemplary embodiment of the present invention.

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a block diagram of an image saving apparatus according to an exemplary embodiment of the present invention. An image saving apparatus 100 may include a camera unit 110, an object extractor 120, a position information adder 130, a global positioning system (GPS) module 140, a grouping unit 150, a storage unit 160, an image processing unit 170, and a communication unit 180.

The camera unit 110 may be configured to generate an image file by taking a picture or a video.

The object extractor 120 may be configured to extract an object from the generated image file. The object extractor 120 may extract an outline of the image from the image file, and may extract an object using the extracted outline. For example, if the camera unit 110 generates an image file by photographing a landscape including a tree, a mountain, a cloud, a building, a person, and the like, each of the tree, the mountain, the cloud, the building, the person, and the like may be extracted as a different object.

The position information adder 130 may be configured to add position information to the extracted object. The position information may include information about a distance from the camera unit 110 to a photographing target, for example, a tree, a mountain, a cloud, a building, a person, and the like, corresponding to each object.

The position information may be generated using a focal distance of the camera unit 110. The camera unit 110 may divide a screen into a plurality of zones, and may calculate a focal distance of each of the zones.

For example, the camera unit 110 may calculate a first focal distance with respect to a first zone, and may calculate a second focal distance with respect to a second zone. The position information adder 130 may calculate a distance from a photographing target that is positioned in the first zone, using the first focal distance with respect to the first zone, and may add the calculated distance as position information of an object corresponding to the photographing target.

The position information may include information about a geographical position of a photographing target corresponding to each object, and may be generated using a GPS signal. The GPS module 140 may receive a GPS signal and calculate coordinates of the image saving apparatus 100 according to the GPS signal.

Position information about each object may be stored for all the objects that are included in a screen.

The image saving apparatus 100 may recognize a direction of the image saving apparatus 100 using a gyro sensor or a terrestrial magnetism sensor. The image saving apparatus 100 may determine a position of the image saving apparatus 100 using GPS information.

The image saving apparatus 100 may calculate a geographical position of each object based on a distance from the image saving apparatus 100 to each object that is calculated using a position of the image saving apparatus 100, a direction, and a focal distance of the image saving apparatus 100. The image saving apparatus 100 may store the calculated distance by associating the calculated distance with each corresponding object.

The position information adder 130 may receive position information about each object via the communication unit 180. The configuration of receiving position information about each object will be described with reference to FIG. 2.

Figure 2A:
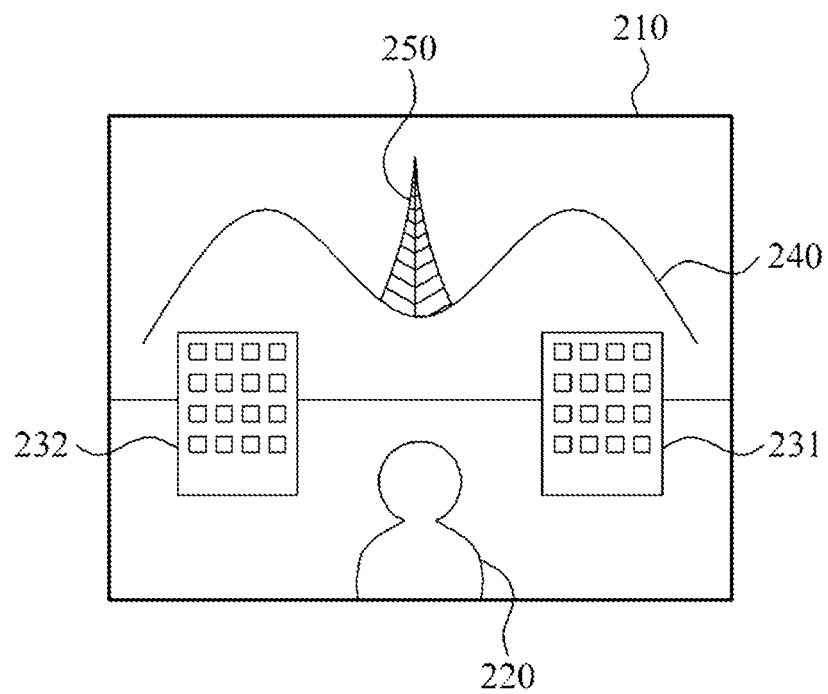
FIG. 2A illustrates objects of an image file according to an exemplary embodiment of the present invention.
Figure 2B:
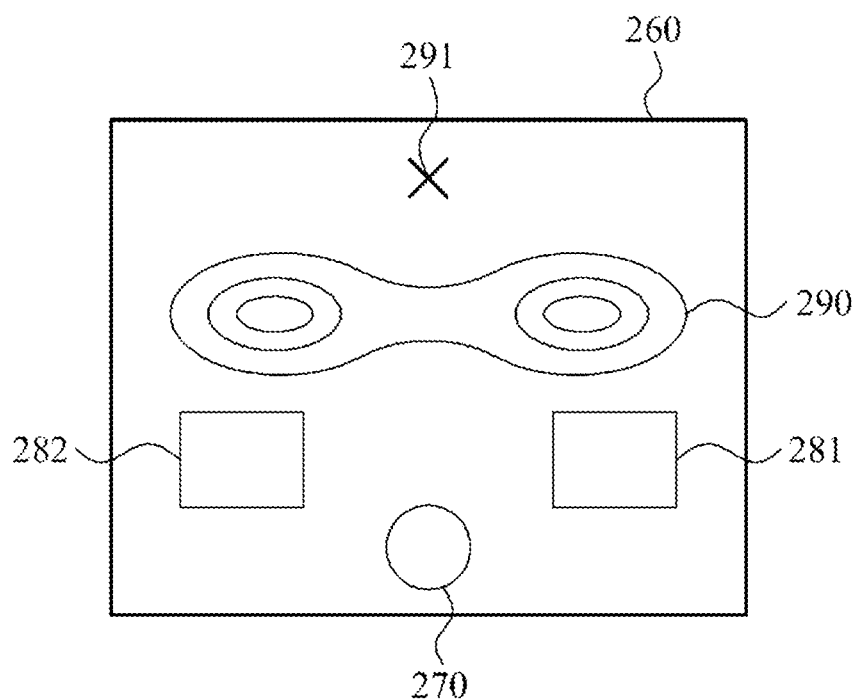
FIG. 2B illustrates objects of an image file according to an exemplary embodiment of the present invention.

FIG. 2A illustrates objects of an image file according to an exemplary embodiment of the present invention. FIG. 2B illustrates objects of an image file according to an exemplary embodiment of the present invention. Although FIG. 2A and FIG. 2B will be described with reference to the features of FIG. 1, exemplary embodiments are not limited thereto.

Referring to FIG. 2A, a screen 210 is a photographing target. A user 220 may control the camera unit 110 to photograph the screen 210 including building 231 and building 232, a mountain 240, and an iron tower 250 by manipulating the image saving apparatus 100.

Referring to FIG. 2B, a map 260 may be configured to display geographical positions of photographing targets. The building 281 and the building 282 may be positioned closest to a user 270, and a mountain 290 may be positioned at a point farther away from the building 281 and the building 282. An iron tower 291 may be positioned farthest away from the user 270.

Referring to FIG. 1, the position information adder 130 may receive the map 260 about a photographing target area via the communication unit 180. The position information adder 130 may identify a photographing target corresponding to each object using the map 260.

For example, the image saving apparatus 100 may estimate a position of each photographing target displayed on a screen 210 based on a distance from the image saving apparatus 100 to each photographing target. The distance from the image saving apparatus 100 to each photographing target may be calculated based on position information, direction information, and a focal distance of the image saving apparatus 100.

The image saving apparatus 100 may map each photographing target on the map 260. For example, if a position of a photographing target is similar to a position of a reference building on the map, the image saving apparatus 100 may identify the photographing target as the reference building on the map 260. The accuracy of an estimated position may be low, but the accuracy of a position on the map may be relatively high. The image saving apparatus 100 may increase the accuracy of a position by updating a position of a photographing target with a position of a reference building on the map 260, instead of using the estimated position.

Referring to FIG. 2A and FIG. 2B, the position information adder 130 may identify, from the map 260, the respective objects, for example, the building 231 and the building 232, the mountain 240, and the iron tower 250 that are positioned on the screen 210 corresponding to a photographing target. The position information adder 130 may identify, from the map 260, coordinates of each of the identified objects.

The position information adder 130 may identify a direction of the image saving apparatus 100 using a compass, an acceleration sensor, a gyroscope, etc. A direction and a distance of each object that is positioned on the screen 210 corresponding to the photographing target may be calculated based on the direction and position of the image saving apparatus 100. The position information adder 130 may verify a location of the image saving apparatus 100 using the GPS module 140, and may calculate coordinates of a photographing target corresponding to each object based on the calculated direction and distance.

Figure 3A:
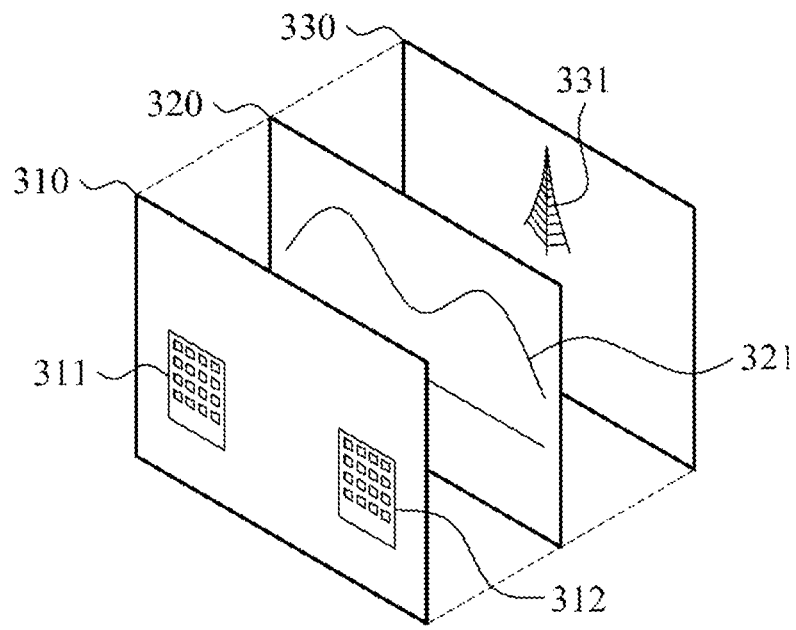
FIG. 3A illustrates a method for adding and storing a layer according to an exemplary embodiment of the present invention.
Figure 3B:
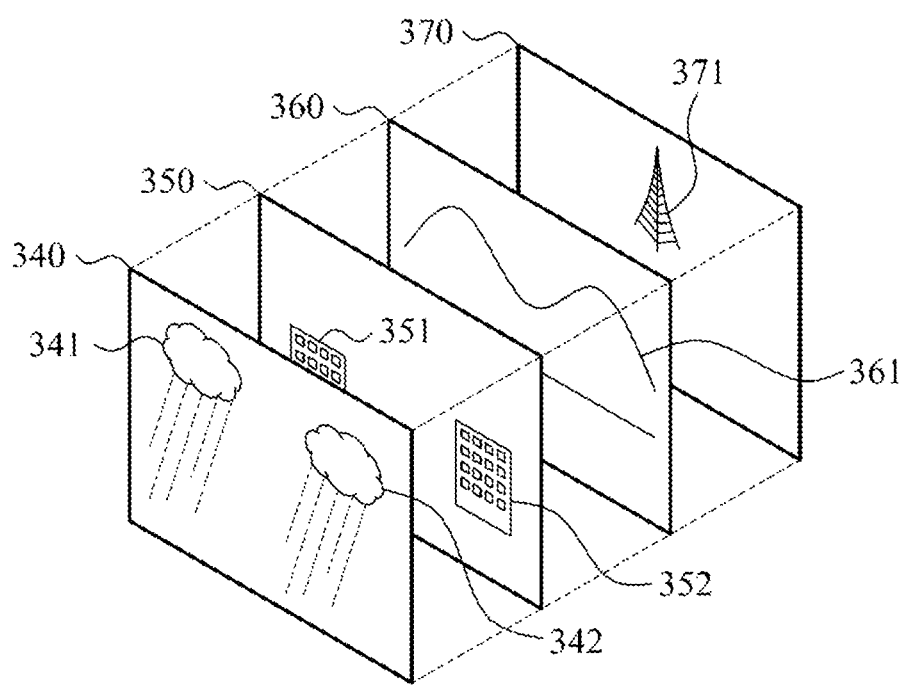
FIG. 3B illustrates a method for adding and storing a layer according to an exemplary embodiment of the present invention.

FIG. 3A illustrates a method for adding and storing a layer according to an exemplary embodiment of the present invention. FIG. 3B illustrates a method for adding and storing a layer according to an exemplary embodiment of the present invention. Although FIG. 3A and FIG. 3B, will be described with reference to the features of FIG. 1, the exemplary embodiments are not limited thereto.

The grouping unit 150 may group extracted objects as at least one layer based on position information. The grouping, as a layer, of objects that are extracted from a screen of FIG. 2A will be described with reference to FIG. 3A.

Referring to FIG. 1, FIG. 2A and FIG. 3A, the grouping unit 150 may group objects based on a distance from the camera unit 110 to a photographing target corresponding to each object. Building 311 and building 312 may be disposed closest to the camera unit 110 and may be included in a first layer 310, a mountain 321 positioned behind the building 311 and the building 312 may be included in a second layer 320, and an iron tower 331 disposed behind the mountain 321 may be included in a third layer 330.

The storage unit 160 may add layer information and position information about each object to information about each object and stores the information in an image file.

The image processing unit 170 may select at least one layer from among a plurality of layers, for example, the first layer 310, the second layer 320, and the third layer 330, and may perform image processing of objects that are included in the selected layer. For example, to express a situation in which the iron tower 331 is on fire, the image processing layer 170 may select the third layer 330 that includes the iron tower 331. The image processing unit 170 may perform image processing of the third layer 330 or the iron tower 331 to be suitable for the situation where the fire has occurred. The storage unit 160 may store the image processed third layer 330 or iron tower 331 in the image file.

Adding an additional layer to an image file will be described with reference to FIG. 3B.

The image saving apparatus 100 may receive an additional layer from an external server. A site such as live virtual earth may provide a server that supports open application programming interface (API). The image saving apparatus 100 may receive real-time map data information that is provided by the server using open API. Additional information about various types of objects on a map may be received in real time.

For example, with respect to a measurement result of Seoul, Korea, the image saving apparatus 100 may receive, from a geographic information system (GIS) map site information about Seoul, Korea, information about a corresponding topography of Seoul, Korea, and information that may be used to extract an image for an additional layer.

The image processing unit 170 may add, to an image file, an additional layer 340 including at least one additional object, for example, cloud 341 and cloud 342. An object of an image file and a layer of the image file may be modified. An object or a layer may be added to the image file or subtracted therefrom.

Layer 350, layer 360, and layer 370 of FIG. 3B may correspond to the first layer 310, the second layer 320, and the third layer 330 of FIG. 3A, respectively. Objects 351 and object 352, object 361, and object 371 of FIG. 3B may correspond to the building 311 and the building 312, the mountain 321, and the iron tower 331 of FIG. 3A, respectively. In FIG. 3B, to express a situation in which it is raining at the location of the, the additional layer 340 including objects indicating the clouds 341 and cloud 342 may be added to the image file. The storage unit 160 may store the image file in which the additional layer 340 is added.

The image saving apparatus 100 may synthesize an object within an image and another object, or may convert the object to the other object. For example, if a waterfall is included in a single image, the waterfall and a background screen may be stored as separate individual objects. A user may select to change a background screen of the waterfall into a background screen of a target image. The image saving apparatus 100 may delete, from the target image, the background screen that is stored as a separate object, and may insert, into the target image, an object corresponding to the background screen of the waterfall. The image saving apparatus 100 may store position information of the deleted background screen as position information of the background screen inserted into the target image. The background screen of the waterfall may be the same as position information of the deleted background screen and may be synthesized with other objects within the target image.

The image processing unit 170 may access an image information server 190 via the communication unit 180. The communication unit 180 may receive, from the image information server 190, information about a photographing target area, and the image processing unit 170 may perform image processing of the image file by referring to information about the photographing target area.

For example, in FIG. 3A, a screen photographed by the camera unit 110 may be an image photographed of the photographing target area one-year earlier. If a fire occurs in the iron tower 331, the image of the iron tower 331 from one year ago may be completely different from an image of the iron tower 331 that is currently on fire or after the fire.

The communication unit 180 may receive, from the image information server 190, a photo of the iron tower 331 that is on fire. The image processing unit 170 may perform image processing of the screen photographed in FIG. 3A. The communication unit 180 may extract the iron tower 331 from the third layer 330 and replace the corresponding iron tower 331 included in the third layer 330 with an image of the iron tower 331 on fire or with an image of the fire damage caused to the iron tower 331 by the fire.

The communication unit 180 may receive information about a weather status of a photographing target area from the image information server 190. Although it may be raining in the photographing target area, the image of the photographic target area may not depict rain in a picture taken one year earlier. The communication unit 180 may receive, from the image information server 190, the additional layer 340 to depict rain in the photographic target area. The image processing unit 170 may perform image processing of inserting, into an image file, the additional layer 340 to depict rain.

The image processing unit 170 may exchange at least one layer, among the first layer 310, the second layer 320, and the third layer 330 included in the image, with another layer. For example, the image processing unit 170 may exchange the third layer 330 including the iron tower 331 with a layer including a cloud. In this case, the image saving apparatus 100 may receive a layer for exchange from the external server.

Figure 4A:
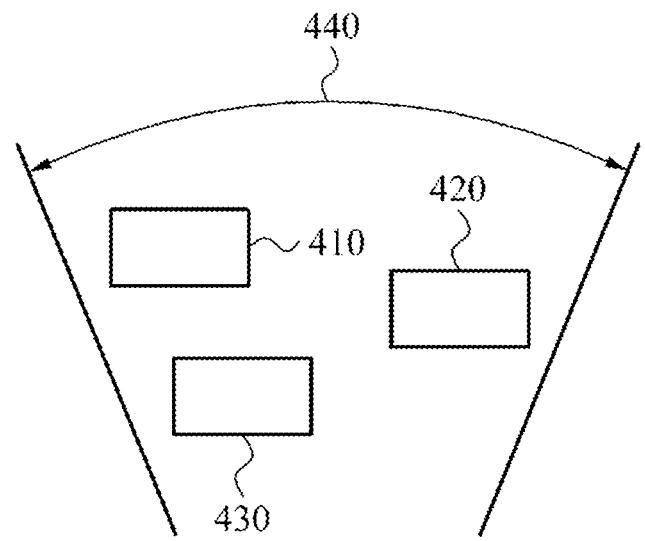
FIG. 4A illustrates a photograph range according to an exemplary embodiment of the present invention.
Figure 4B:
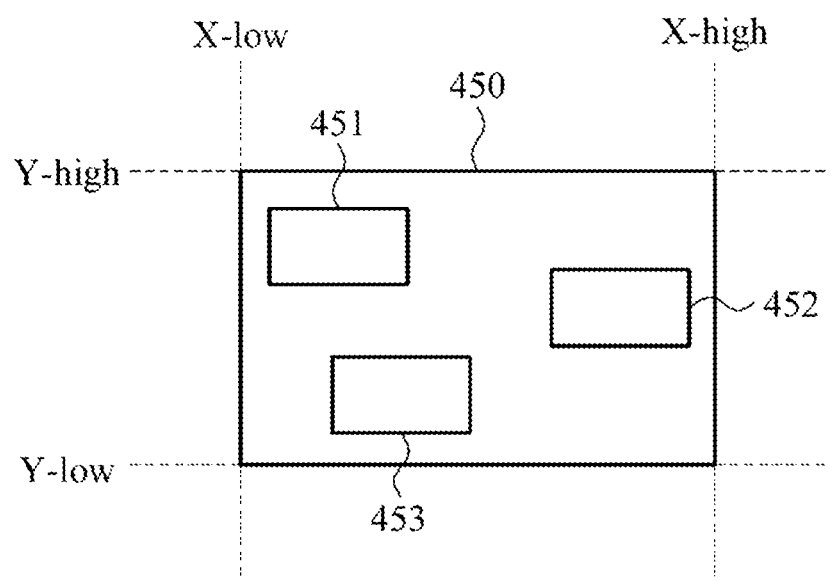
FIG. 4B illustrates a photograph range according to an exemplary embodiment of the present invention.

FIG. 4A illustrates a photograph range according to an exemplary embodiment of the present invention. FIG. 4B illustrates a photograph range according to an exemplary embodiment of the present invention. Although FIG. 4A and FIG. 4B, will be described with reference to the features of FIG. 1, the exemplary embodiments are not limited thereto.

The image saving apparatus 100 may store the photograph range 440 of an image in the image file. If the image saving apparatus 100 receives an object to be synthesized with the image from the image information server 190, the image saving apparatus 100 may select the object to be synthesized with the corresponding image using the photograph range of the image.

In FIG. 4A, a photograph range 440 depicts the photograph range in which the camera unit 110 may be capable of taking a picture. Object 410, object 420, and object 430 are positioned within the photograph range 440.

FIG. 4B illustrates four parameters to specify the photograph range. Although FIG. 4B illustrates four parameters, aspects need not be limited thereto such that any number of parameters may be used.

Among objects that are included in a measured photograph range 450 may be determined according to multiple parameters. For example, referring to FIG. 4B, the parameters Y-low, X-low, Y-high, and X-high may determine the measured photograph range 450. Y-low may be determined to be a position of an object 453 closest to a photographer, X-low may be determined to be a position of a leftmost positioned object, object 451, from a viewpoint of the photographer, X-high may be determined to be a position of as a rightmost positioned object, object 452, from a viewpoint of the photographer, and Y-high may be determined to be an object, object 451, that is farthest from the photographer.

Referring again to FIG. 1, the communication unit 180 may transmit the photograph range 440 and may transmit the measured photograph range 450 to the image information server 190. The communication unit 180 may receive, from the image information server 190, a map of the photograph range 440, information about a weather state of the photograph range 440, and the like. The communication unit 180 may receive an object corresponding to the photograph range 440 from the image information server 190. The received object may correspond to an object in which a change has occurred since the photograph was taken. For example, if a new building is built in the photograph range since the photograph was taken, the object received by the image saving apparatus 100 may be an object indicating the newly built building. The image saving apparatus 100 may reflect that the building has been built by inserting the received object in the photographed image.

Figure 5:
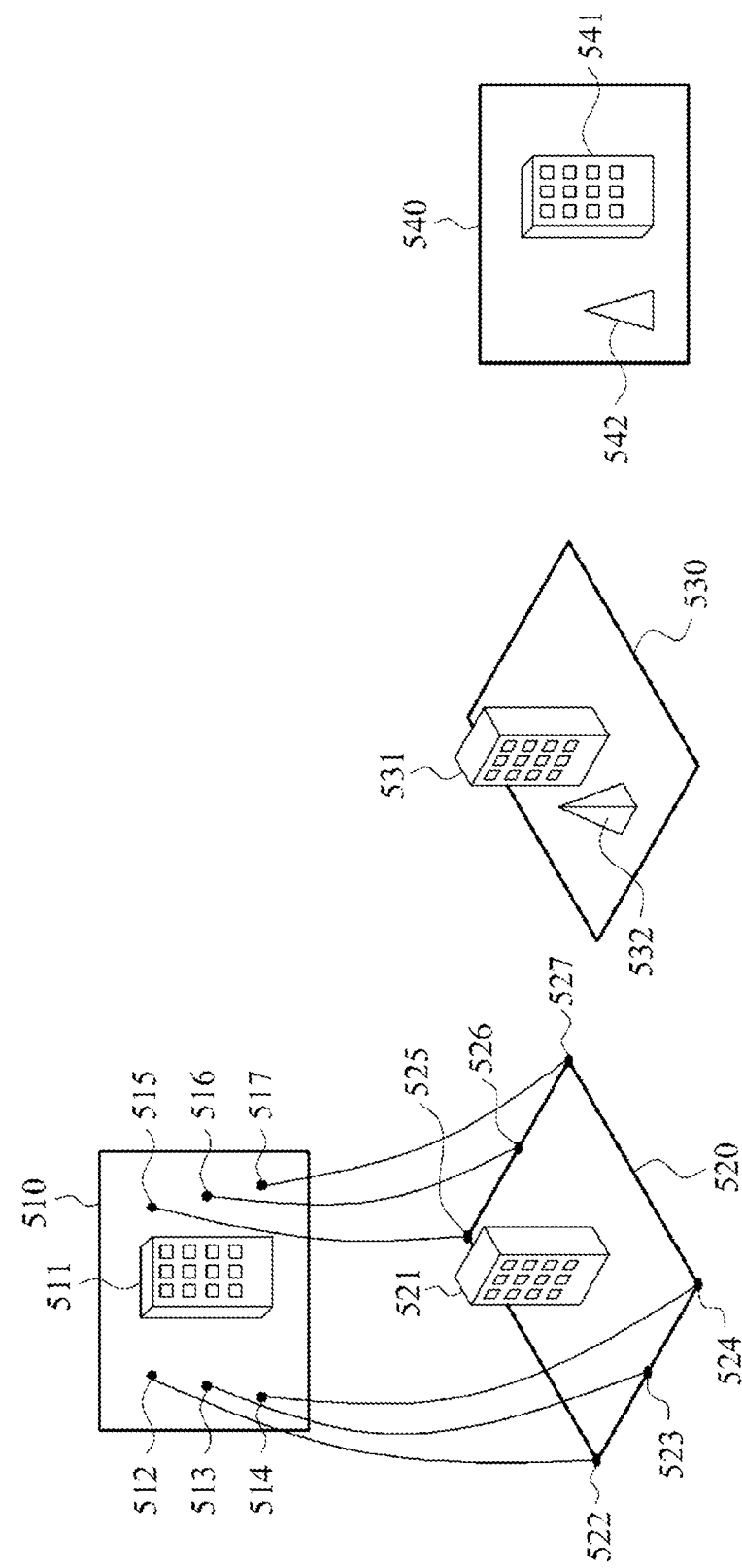
FIG. 5 illustrates a method for dynamic image synthesis according to an exemplary embodiment of the present invention.

FIG. 5 illustrates a method for dynamic image synthesis according to an exemplary embodiment of the present invention. Although FIG. 5 will be described with reference to the features of FIG. 1, the exemplary embodiments are not limited thereto.

Referring to FIG. 1, the image processing unit 170 may perform dynamic image processing of an acquired image by considering a change in a state of the photograph range.

Referring to FIG. 1 and FIG. 5, the image processing unit 170 may extract reference point 512, reference point 513, reference point 514, reference point 515, reference point 516, and reference point 517 from a stored image 510, and may determine respective corresponding position 522, corresponding position 523, corresponding position 524, corresponding position 525, corresponding position 526, and corresponding position 577 of the extracted reference point 512, reference point 513, reference point 514, reference point 515, reference point 516, and reference point 517 on a map 520.

The image processing unit 170 may map an object 521 corresponding to a building 511 on the map 520 by referring to the corresponding position 522, corresponding position 523, corresponding position 524, corresponding position 525, corresponding position 526, and corresponding position 527 of the extracted reference point 512, reference point 513, reference point 514, reference point 515, reference point 516, and reference point 517 of the screen 510.

The image processing unit 170 may divide a stored image into a reference number of areas, and may determine center points of divided areas as reference points. For example, the image processing unit 170 may divide the stored image on screen 510 into two, three, four, nine, etc. images. Center points of the divided images may be determined to be the reference point 512, reference point 513, reference point 514, reference point 515, reference point 516, and reference point 517 of the screen 510. A position of an object disposed on a reference point may be used to determine a position of the reference point.

The image processing unit 170 may extract a reference number of representative objects from a stored image, and may determine a position of an extracted object to be a reference point.

Referring again to FIG. 1, the communication unit 180 may receive information about the photograph range from the image information server 190 in the form of map 530. Information about the photograph range may include information about current weather in the photograph range, information about a new structure in the photograph range, etc.

The communication unit 180 may receive, from the image information server 190, information about the size or shape of a newly built structure in the photograph range of the screen 510 or may receive a picture photographed from the structure. The communication unit 180 may receive coordinates of the new structure 532 from the image information server 190. Referring to FIG. 5, the image processing unit 170 may synthesize an object 531 corresponding to a building and an object 532 corresponding to the newly built structure on the map 530, by referring to the coordinates of the structure 532.

Referring to FIG. 1 and FIG. 5, the image processing unit 170 may synthesize an object 542 corresponding to the structure 532 into an image 540 including an object 541 corresponding to the building 531.

The image processing unit 170 may insert the object 542 corresponding to the structure 532 into the same layer as the object 541 corresponding to the building 531. The image processing unit 170 may insert, into the image 540, an additional layer including the object 542 corresponding to the structure 532 which may have been newly built since the picture 520 was taken.

Referring to FIG. 5, a photographing point in time of the image 510 may be different from a current point in time. Therefore, even though the image 510 does not accurately reflect the current image of the photograph range, the image saving apparatus 100 may perform image processing by receiving information about the photograph range from the image information server 190 and reflecting a change in the photograph range in the image 510.

The communication unit 180 may receive information about weather of the photograph range from the image information server 190. The communication unit 180 may additionally receive, from the image information server 190, an image and objects to perform image processing of the corresponding weather. The image processing unit 170 may perform image processing of the image based on information about the weather of the photograph range.

For example, if a screen is obtained by taking a picture of clear sky, the image saving apparatus 100 may receive, from the image information server 190, an object that indicates the current weather at the location the picture was taken. For example, the image saving apparatus 100 may receive, from the image information server 190, an object indicating a cloud and may synthesize the received object with the stored clear sky.

Although FIG. 5 depicts image processing of an image by reflecting a change in the photograph range, exemplary embodiments are not limited thereto. Image processing may occur according to a user selection regardless of a change in the photograph range. For example, image processing may be performed as if it is snowing in the photograph range, even though it is raining at the photograph range. A famous structure such as Nam-dae moon, the Statue of Liberty, and the like may be synthesized with respect to a reference point of the photographed image.

The image saving apparatus 100 may also receive, from the image information server 190, a parameter used to perform image processing on a corresponding image. The image saving apparatus 100 may receive, from the image information server 190, a parameter used to decrease the brightness of a screen. By decreasing the brightness of the screen, the image saving apparatus 100 may change an image photographed during the day to appear as if the image is was photographed at night.

The image saving apparatus 100 may delete an object corresponding to the sun from the image photographed during the day, and may receive an object indicating the moon from the image information server 190 and then synthesize the received object in the image photographed during the day.

Figure 6:
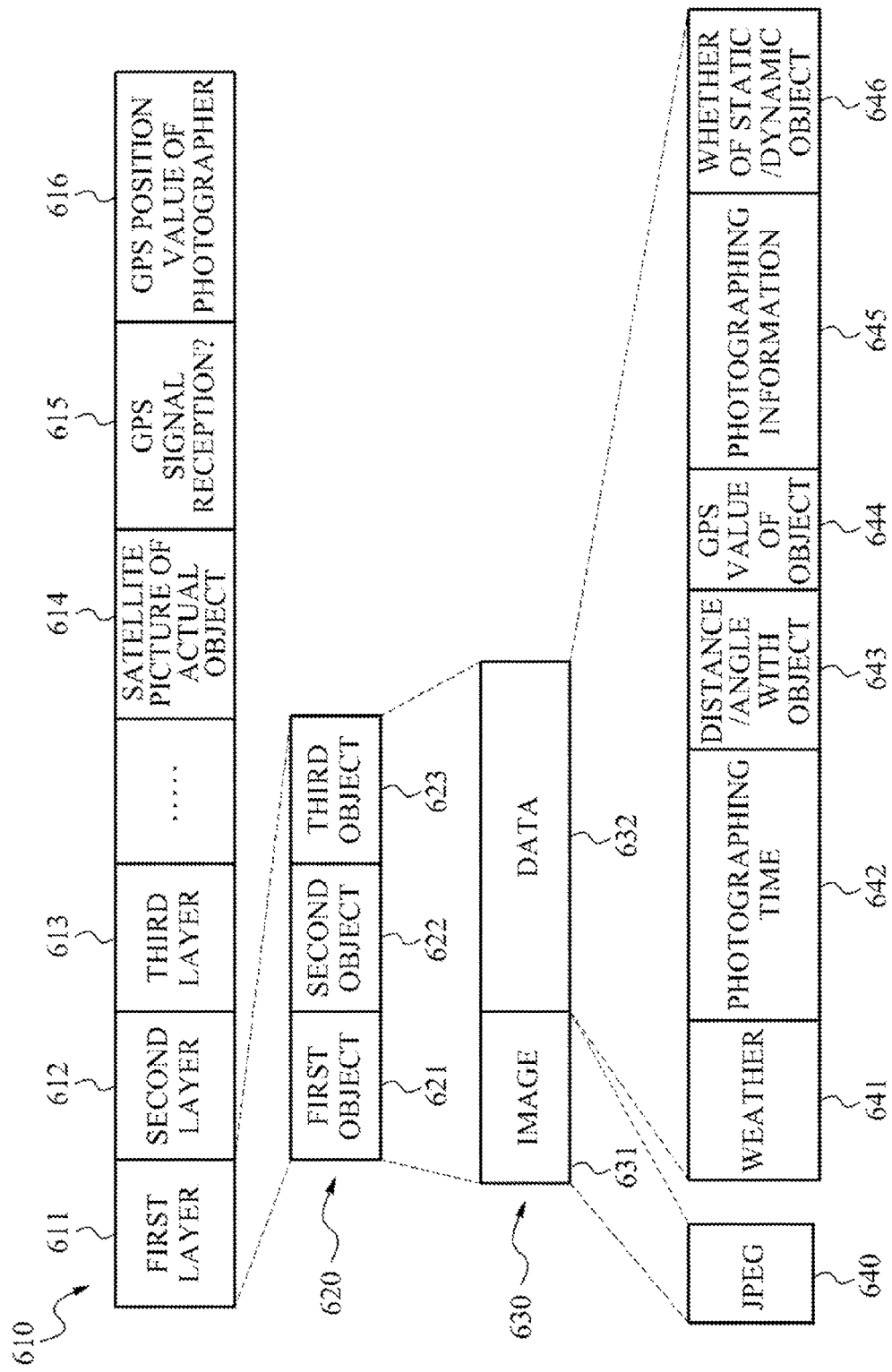
FIG. 6 illustrates a structure of an image file according to an exemplary embodiment of the present invention.

FIG. 6 illustrates a structure of an image file according to an exemplary embodiment of the present invention.

An image file 610 may include information about a plurality of layers, for example, a first layer 611, a second layer 612, and a third layer 613. The image file 610 may include information 614 about a satellite picture of an actual object of each layer. Here, the information 614 may be updated by reflecting a change in a natural environment, weather, and the like in the photograph range. The image file 610 may include information 615 about whether a GPS signal is received, and information 616 about a GPS position value. Although FIG. 6 illustrates a structure of an image file, aspects need not be limited thereto such that the structure of the image file may differ from the structure depicted in FIG. 6.

Information 620 about the first layer 611 may include information about a first object 621, a second object 622, and a third object 623 that are included in the first layer 611. Information 630 about an object included in the first layer 611 may include information about an image 631 of the object and information data 632 about the object. Information about the image 631 of the object may include an image of the object at a photographing point in time and may be stored in a format of joint photographic experts group (JPEG) 640. Information about the data 632 of the object may include a weather condition 641 when the object is photographed, a photographing time 642 of the object, a distance and angle 643 between the camera unit 110 and the object, a GPS position value 644 of the object, photographing information 645, and information 646 a dynamic object indicator to indicate whether the object is static or dynamic.

Figure 7:
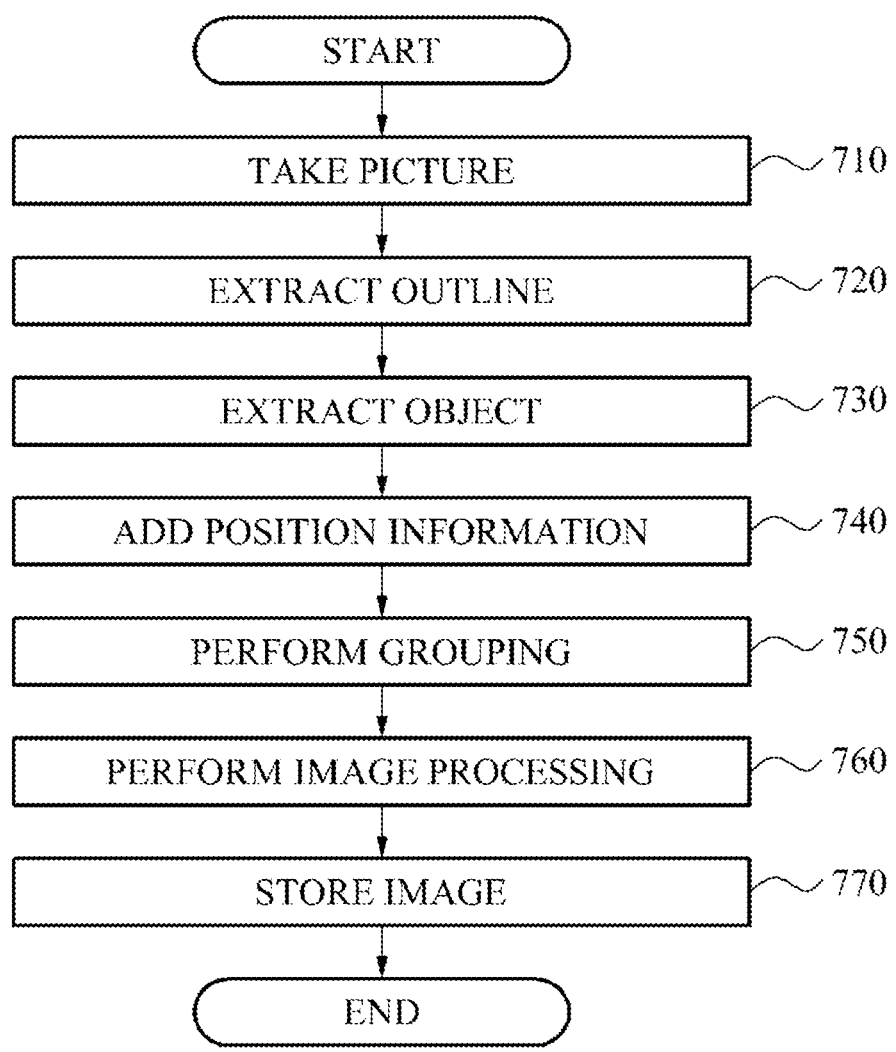
FIG. 7 is a flowchart illustrating an image saving method according to an exemplary embodiment of the present invention.

FIG. 7 is a flowchart illustrating an image saving method according to an exemplary embodiment of the present invention. Although FIG. 7 will be described with reference to the features of FIG. 1, the exemplary embodiments are not limited thereto.

In operation 710, an image saving apparatus 100 may take a picture using a camera.

In operation 720, the image saving apparatus 100 may extract an outline from the photographed image.

In operation 730, the image saving apparatus 100 may extract an object from the photographed picture. For example, a tree, a mountain, a cloud, a building, a person, and the like included in the picture may be individual objects.

In operation 740, the image saving apparatus 100 may add position information to the extracted object. The position information may include information about a distance from the camera unit 110 to a photographing target. For example, if the picture photographed in operation 710 includes a tree, a mountain, a cloud, a building, a person, and the like, the position information may include information about a distance from the camera unit 110 to the tree, the mountain, and the building. The position information may also be a reference distance from the camera unit 110 to the tree, the mountain, and the building, and may also be a relative distance that is obtained by comparing a distance from the camera unit 110 to the tree and a distance from the camera unit 110 to the mountain.

The image saving apparatus 100 may generate distance information using a focal distance of the camera. In operation 710, if the picture is taken, the camera may divide a screen and focus on each divided portion. The image saving apparatus 100 may estimate a distance from each portion using a focal distance with respect to a portion. In operation 740, the image saving apparatus 100 may determine an object disposed in a portion of the screen of the camera, and may generate information about a distance from the camera to the object according to the position information about the object.

The position information may include information about a geographical position of a photographing target corresponding to each object and may include information about coordinates on a map. The position information may be generated using a GPS signal.

In operation 750, the image saving apparatus 100 may group extracted objects as a layer based on position information.

The image saving apparatus 100 may group, as a first layer, objects corresponding to a photographing target that are positioned to be closest to the camera, and may group, as a second layer, objects corresponding to a photographing target that are positioned to be further away from the camera than the objects in the first layer.

The image saving apparatus 100 may divide a photographed region into a plurality of zones. The image saving apparatus 100 may group, as a first layer, objects corresponding to a photographing target that are positioned in a first zone among the plurality of zones, and may group, as a second layer, objects corresponding to a photographing target that are positioned in a second zone.

In operation 760, the image saving apparatus 100 may select at least one layer from among a plurality of layers, and may perform image processing of objects that are included in the selected layer. The image saving apparatus 100 may add an additional layer to the image and store the image. The additional layer may include at least one additional object.

In operation 770, the image saving apparatus 100 may add, to each object, layer information and position information about each object and store the added information in the image file. Individual information about each object may be added to the image file. Additional image processing using the stored image file may be performed. For example, an object may be inserted into the stored image file, or a layer may be added to the image file. The added layer may correspond to a background of an image and may be used to indicate a change in weather at the location of the photograph, a new building, and the like.

The exemplary embodiments according to the present invention may be recorded in non-transitory computer-readable media including program instructions to implement various operations embodied by a computer. The non-transitory computer-readable medium may include, alone or in combination with the program instructions, data files, data structures, and the like. The non-transitory computer-readable medium and program instructions may be those specially designed and constructed for the purposes of the present invention, or they may be of the kind well-known and available to those having skill in the computer software arts.

According to exemplary embodiments of the present invention, it may be possible to store additional information about individual objects that are included in an image file.

According to exemplary embodiments of the present invention, it may be possible to provide a dynamic picture by performing image processing of a picture, based on neighboring environmental conditions.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for storing and updating an image file, comprising:
   extracting, by an object extracting unit, a first object from the image file;
   determining, by a position information adding unit, first position information of the first object according to a location of a capturing of the image of the image file;
   grouping, by a grouping unit, the first object into a first layer according to the first position information;
   determining, by the position information adding unit, an updated condition of the first position information of the first object;
   generating, by an image processing unit, a second image according to the updated condition of the first position information in a second layer; and
   storing, by an image saving unit, the first layer and the second layer.

2. The method of claim 1, further comprising:
   displaying the first layer and the second layer superimposed on each other as an image file.

3. The method of claim 1, wherein the determining position information of the first object according to the location of the capturing of the image file comprises:
   dividing the image file into a plurality of zones;
   determining a focal distance of each zone; and
   determining the first position information of the object according to the focal distance of a first zone corresponding to the zone in which the first object is located in the image file.

4. The method of claim 1, wherein the determining position information of the first object according to the location of the image file comprises:
   receiving a map corresponding to the location of the capturing of the image of the image file;
   determining a map object on the map corresponding to the first object; and
   determining position information of the first object according to a position information of the map object.

5. The method of claim 1, wherein determining position information of the first object according to the location of the image file comprises:
   receiving a global positioning system (GPS) location of the image of the image file; and
   calculating the location of the first object according to the GPS location of the image file.

6. The method of claim 1, wherein determining an updated condition of the first object comprises at least one of receiving an updated image of the location of the image file; receiving a weather condition of the location of the image file; receiving a current time at the location of the image file, determining if the first object is a dynamic object.

7. The method of claim 6, further comprising:
   displaying the first layer, the second layer, and the third layer superimposed on each other as an image file.

8. The method of claim 1, further comprising:
   extracting, by an object extracting unit, a second object from the image file;
   determining, by a position information adding unit, second position information of the second object;
   grouping, by a grouping unit, the second object into a third layer according to the second position information; and
   storing, by an image saving unit, the first layer, the second layer, and the third layer.

9. An apparatus to store an updated image file, comprising:
   an object extractor to determine a first object in the image file;
   a position information adder to determine a first location of the first object and to receive updated condition information about the first location of the first object;
   a grouping unit to group the first object into a first layer according to the location of the first object; and
   an image processing unit to generate a second layer including a second image according to the updated condition of the location of the first object.

10. The apparatus of claim 9, further comprising: a global positioning system (GPS) module to receive a GPS location of the image of the image file and to determine the first location of the first object according to the GPS location.

11. The apparatus of claim 9, wherein the position information adder determines the first location of the first object, comprises:
   receiving a map corresponding to the location of the image of the image file;
   determining a map object on the map corresponding to the first object; and
   determining location of the first object according to a location of the map object.

12. The apparatus of claim 9, wherein updated condition information about the first location comprises at least one of an updated image of the first location; a weather condition of the first location; a current time at the first location, a dynamic object indicator of the first object.

13. The apparatus of claim 9, the position information adder determines the first location of the first object, comprises:
   dividing the image file into a plurality of zones;
   determining a focal distance of each zone; and
   determining the first position information of the object according to the focal distance of a first zone corresponding to the zone in which the first object is located in the image file.

14. The apparatus of claim 9, wherein the object extractor determines a second object in the image file; the position information adder determines a second location of the second object and receives updated condition information about the second location of the second object; and the grouping unit groups the second object into a third layer according to the location of the second object.

15. A method for storing a dynamic image file, comprising:
   receiving an image comprising an extracted first object and a determined first position of the extracted first object, the determined first position of the extracted first object being a location of a capturing of the image;
   grouping, by a grouping unit, the extracted first object of the image into a first layer according to the determined first position of the extracted first object;
   receiving, by a position information adding unit, updated condition information of the extracted first object; and processing, by an image processing unit, the image of the extracted first object to generate a second image according to the updated condition information; and storing the second image in a second layer, wherein when displaying the dynamic image file, the second layer is superimposed on the first layer.

16. The method of claim 15, wherein the processing the image of the first object comprises:

editing the image of the first object according to the condition information; and storing the edited image in the first layer.

17. The method of claim 15, further comprising:

grouping, by a grouping unit, a second object of the image into a third layer according to a second position; and storing, by an image saving unit, the first layer and the third layer, wherein if displaying the image file, the first layer and the third layer are superimposed on each other.

* * * * *